United States Patent
Ozaki et al.

(10) Patent No.: US 12,345,335 B2
(45) Date of Patent: Jul. 1, 2025

(54) SHAFT SEAL DEVICE AND ROTARY MACHINE

(71) Applicant: MITSUBISHI HEAVY INDUSTRIES, LTD., Tokyo (JP)

(72) Inventors: Kohei Ozaki, Tokyo (JP); Azumi Yoshida, Tokyo (JP); Tatsuro Furusho, Kanagawa (JP); Shin Nishimoto, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/276,351

(22) PCT Filed: Jun. 29, 2022

(86) PCT No.: PCT/JP2022/025923
§ 371 (c)(1),
(2) Date: Aug. 8, 2023

(87) PCT Pub. No.: WO2023/008060
PCT Pub. Date: Feb. 2, 2023

(65) Prior Publication Data
US 2024/0125391 A1    Apr. 18, 2024

(30) Foreign Application Priority Data
Jul. 30, 2021    (JP) ................. 2021-126309

(51) Int. Cl.
*F16J 15/3292*    (2016.01)
*F16J 15/44*    (2006.01)

(52) U.S. Cl.
CPC ......... *F16J 15/3292* (2013.01); *F16J 15/442* (2013.01)

(58) Field of Classification Search
CPC .............................. F16J 15/3292; F16J 15/442
See application file for complete search history.

(56) References Cited

U.S. PATENT DOCUMENTS 7,976,026 B2 *   7/2011   Verma ................. F16J 15/3292
                                                            277/355
2003/0068224 A1   4/2003   Uehara et al.
(Continued)

FOREIGN PATENT DOCUMENTS

EP    2 818 770    12/2014
JP    2002-13647    1/2002
(Continued)

OTHER PUBLICATIONS

International Search Report issued Sep. 20, 2022 in corresponding International Application No. PCT/JP2022/025923, with English translation.
(Continued)

*Primary Examiner* — Eugene G Byrd
(74) *Attorney, Agent, or Firm* — Wenderoth, Lind & Ponack, L.L.P.

(57) ABSTRACT

A shaft seal device according to at least one embodiment of the present disclosure includes: a plurality of thin plates arranged in a circumferential direction of a rotational shaft and each having a width in an axial direction of the rotational shaft and a seal ring including a seal mounting groove for mounting the plurality of thin plates. An inner wall of the seal mounting groove on one side in the axial direction has a groove formed along the circumferential direction, in an inner region in a radial direction of the rotational shaft.

8 Claims, 7 Drawing Sheets

(56) References Cited

U.S. PATENT DOCUMENTS

| | | | |
|---|---|---|---|
| 2006/0033285 A1* | 2/2006 | Nishimoto | F16J 15/3292 |
| | | | 277/355 |
| 2006/0208427 A1* | 9/2006 | Wright | F16J 15/3292 |
| | | | 277/413 |
| 2008/0007010 A1* | 1/2008 | Williams | F01D 11/001 |
| | | | 277/355 |
| 2013/0004310 A1 | 1/2013 | Uehara et al. | |
| 2016/0010751 A1* | 1/2016 | Uehara | F16J 15/3252 |
| | | | 277/355 |
| 2016/0258536 A1* | 9/2016 | Nishimoto | F16J 15/3292 |

FOREIGN PATENT DOCUMENTS

| | | | |
|---|---|---|---|
| JP | 2003-113945 | 4/2003 | |
| JP | 2005-2995 | 1/2005 | |
| JP | 2008-39180 | 2/2008 | |
| JP | 2008-509369 | 3/2008 | |
| JP | 2011-236969 | 11/2011 | |
| JP | 2014-163420 | 9/2014 | |
| WO | 2006/016098 | 2/2006 | |
| WO | WO-2014129371 A1 * | 8/2014 | F01D 11/001 |

OTHER PUBLICATIONS

International Preliminary Report on Patentability issued Feb. 8, 2024 in corresponding International Application No. PCT/JP2022/025923, with English translation.

\* cited by examiner

SHAFT SEAL DEVICE AND ROTARY MACHINE

TECHNICAL FIELD

The present disclosure relates to a shaft seal device and a rotary machine.

This application claims the priority of Japanese Patent Application No. 2021-126309 filed on Jul. 30, 2021, the content of which is incorporated herein by reference.

BACKGROUND

Generally, in a gas turbine, a steam turbine, or the like, a shaft seal device for reducing a leakage rate of a gas leaking from a high-pressure side to a low-pressure side is disposed around a shaft of a rotational shaft. As an example of the shaft seal device, a leaf seal (registered trademark) is known (see, for example, Patent Document 1).

CITATION LIST

Patent Literature

Patent Document 1: JP2005-2995A

SUMMARY

Technical Problem

A leaf seal can reduce a leakage rate compared to, for example, a labyrinth seal or the like. In addition, the leaf seal has a relatively long life because a distal end of a leaf does not come into contact with a mating member during rated operation of a rotary machine. However, the leaf seal tends to be costly due to the large number of its constituent components.

In view of the above, an object of at least one embodiment of the present disclosure is to reduce the cost of the shaft seal device.

Solution to Problem (1) A shaft seal device according to at least one embodiment of the present disclosure includes: a plurality of thin plates arranged in a circumferential direction of a rotational shaft and each having a width in an axial direction of the rotational shaft; and a seal ring including a seal mounting groove for mounting the plurality of thin plates. An inner wall of the seal mounting groove on one side in the axial direction has a groove formed along the circumferential direction, in an inner region in a radial direction of the rotational shaft.

(2) A rotary machine according to at least one embodiment of the present disclosure includes: the rotational shaft; and the shaft seal device according to any one of claims 1 to 8.

Advantageous Effects

According to at least one embodiment of the present disclosure, it is possible to reduce a cost of a shaft seal device.

DETAILED DESCRIPTION

Figure 1:
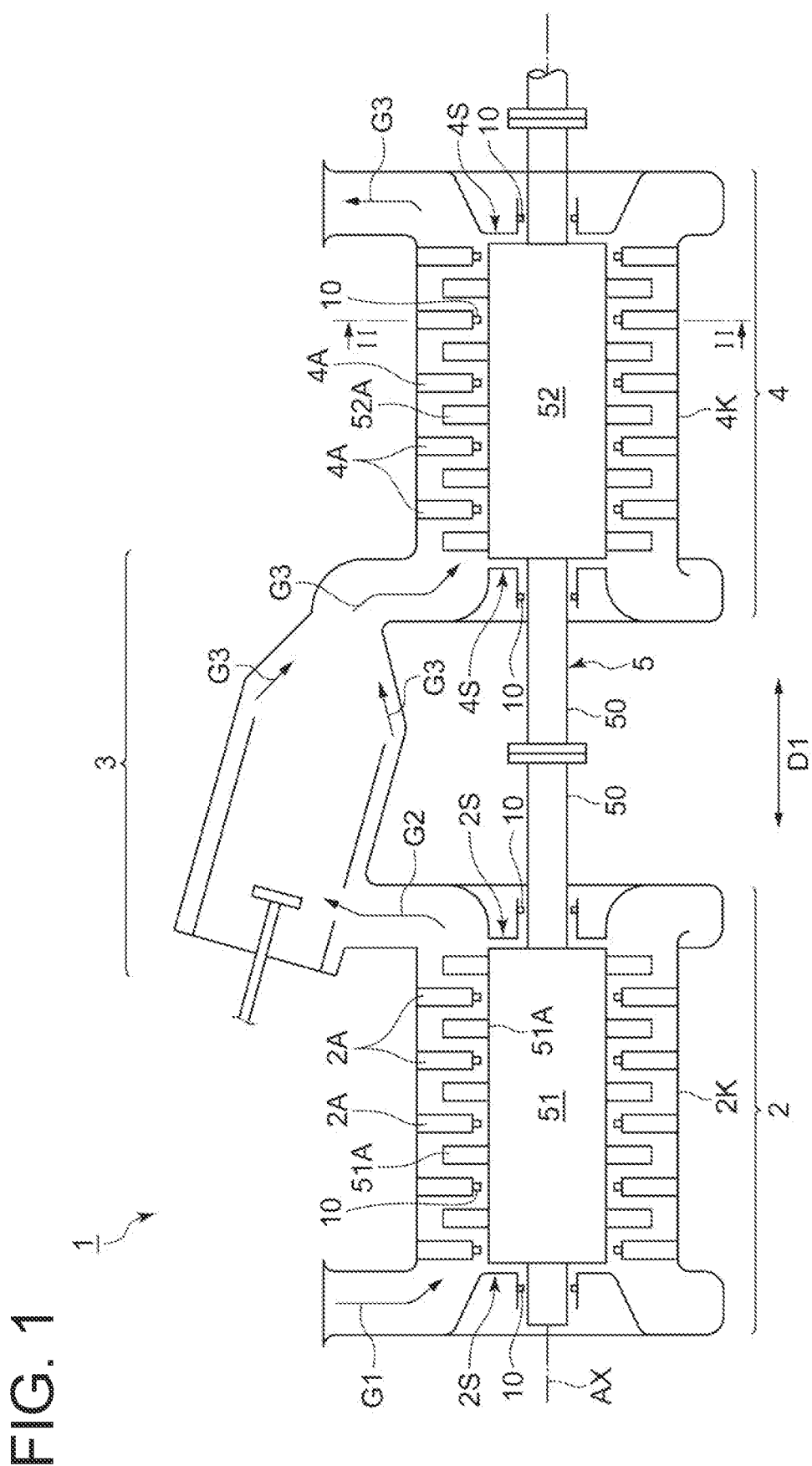
FIG. 1 is a schematic view showing an example of a gas turbine system including a rotary machine according to an embodiment.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

An embodiment of a shaft seal device of the present disclosure and a rotary machine using the same will be described below with reference to the drawings, but it goes without saying that the present disclosure is not interpreted limitedly only to this. Further, in the present embodiment, a case where the rotary machine to which the present disclosure is applied is a turbine or a compressor for a gas turbine system will be described as an example. However, the present disclosure can also be applied to a rotational shaft or the like of another rotary machine such as a steam turbine, a water turbine, a refrigerator, a pump, or a gas turbine engine for aircraft.

The same reference sign is given to a constituent element which is common in each embodiment, and repetitive description is avoided.

FIG. 1 is a schematic view showing an example of a gas turbine system 1 including a rotary machine according to an embodiment. As shown in FIG. 1, the gas turbine system 1 includes a compressor (rotary machine) 2 for compressing air G1 into compressed air G2, a combustor 3 for supplying fuel to the compressed air G2 compressed by the compressor 2 to be mixed and burned, a turbine (rotary machine) 4 supplied with a combustion gas G3 burned by the combustor 3, and a rotor 5 having a rotational shaft 50 for connecting a rotational shaft 51 arranged in the compressor 2 and a rotational shaft 52 arranged in the turbine 4.

The compressor 2 includes a casing 2K where the air G1 is introduced into an interior space. The compressor 2 compresses the air introduced into the interior space of the casing 2K into the compressed air G2. The compressor 2 is provided with a support part 2S including a bearing for rotatable supporting the rotational shaft 50.

The turbine 4 includes a casing 4K where the combustion gas G3 is introduced into an interior space. The turbine 4 introduces the combustion gas G3 generated in the combustor 3 into the interior space of the casing 4K and expands the combustion gas G3, thereby converting thermal energy of the combustion gas G3 into rotational energy. The turbine 4 is provided with a support part 4S including a bearing for rotatable supporting the rotational shaft 50.

The rotor 5 includes rotor blades 51A which are disposed on the rotational shaft 51 arranged in the interior space of the casing 2K, and rotor blades 52A which are disposed on the rotational shaft 52 arranged in the interior space of the casing 4K, The compressor 2 includes stator vanes 2A arranged in the casing 2K. The plurality of stator vanes 2A of the compressor 2 and the plurality of rotor blades 51A disposed on the rotational shaft 51 are arranged alternately in a direction parallel to the axis direction of an axis AX of the rotational shaft 50.

The turbine 4 includes stator vanes 4A arranged in the casing 4K. The plurality of stator vanes 4A of the turbine 4 and the plurality of rotor blades 52A disposed on the rotational shaft 52 are arranged alternately in the axial direction of the rotational shaft 50.

Further, the gas turbine system 1 includes shaft seal devices 10 which are arranged in inner peripheral portions of the stator vanes 2A in the casing 2K of the compressor 2 and are configured to seal the periphery of the rotational shaft 51, and the shaft seal devices 10 which are arranged in the casing 4K of the turbine 4 and are configured to seal the periphery of the rotational shaft 52. The shaft seal devices 10 arranged in the compressor 2 suppress leakage of the compressed air G2, which is a working fluid, from a high-pressure space side to a low-pressure space side. Further, the shaft seal devices 10 of the compressor 2 are arranged in the support part 2S. The shaft seal devices 10 arranged in the turbine 4 suppress leakage of the combustion gas G3, which is a working fluid, from a high-pressure side to a low-pressure side. The shaft seal devices 10 of the turbine 4 are arranged in inner peripheral portions of the stator vanes 4A. Further, the shaft seal devices 10 of the turbine 4 are arranged in the support part 4S.

In the gas turbine system 1, the combustion gas G3 introduced from the combustor 3 is supplied to the rotor blades 52A in the turbine 4. Whereby, the thermal energy of the combustion gas G3 is converted into mechanical rotational energy to generate power. A part of the power generated in the turbine 4 is transmitted to the compressor 2 via the rotational shaft 50. A part of the power generated in the turbine 4 is used as power for the compressor 2.

Next, the shaft seal device 10 according to the present embodiment will be described with reference to FIG. 2.

Figure 2:
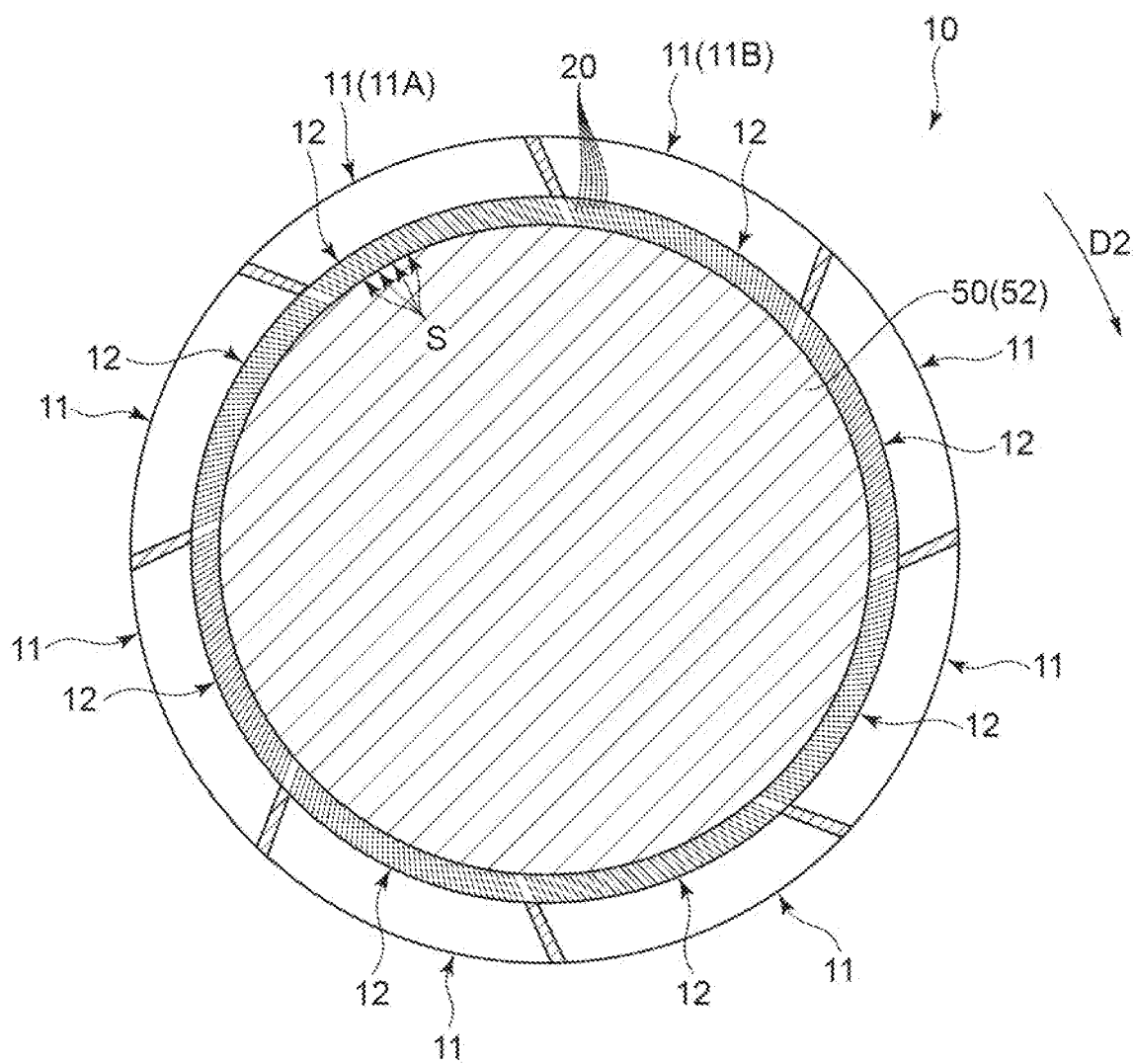
FIG. 2 is a schematic cross-sectional view showing an outline of a shaft seal device according to the present embodiment.

FIG. 2 is a schematic cross-sectional view showing an outline of the shaft seal device 10 according to the present embodiment.

FIG. 2 is a cross-sectional view corresponding to a view in FIG. 1, and shows only seal segments 11.

Figure 3:
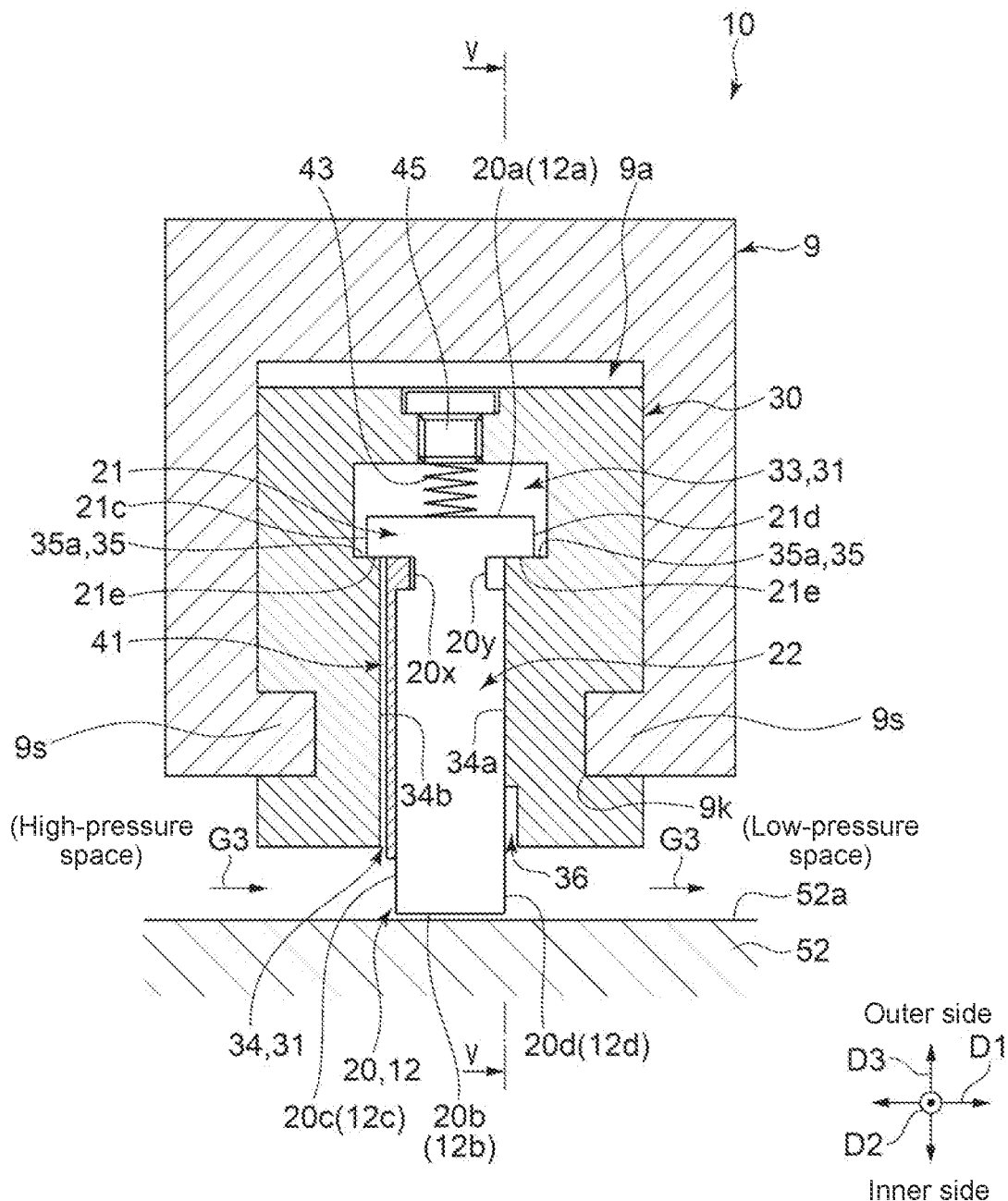
FIG. 3 is a schematic cross-sectional view showing an outline of the shaft seal device according to an embodiment.

FIG. 3 is a schematic cross-sectional view showing an outline of the shaft seal device 10 according to an embodiment and shows a cross section including the axis AX of the rotational shaft 52.

Figure 4:
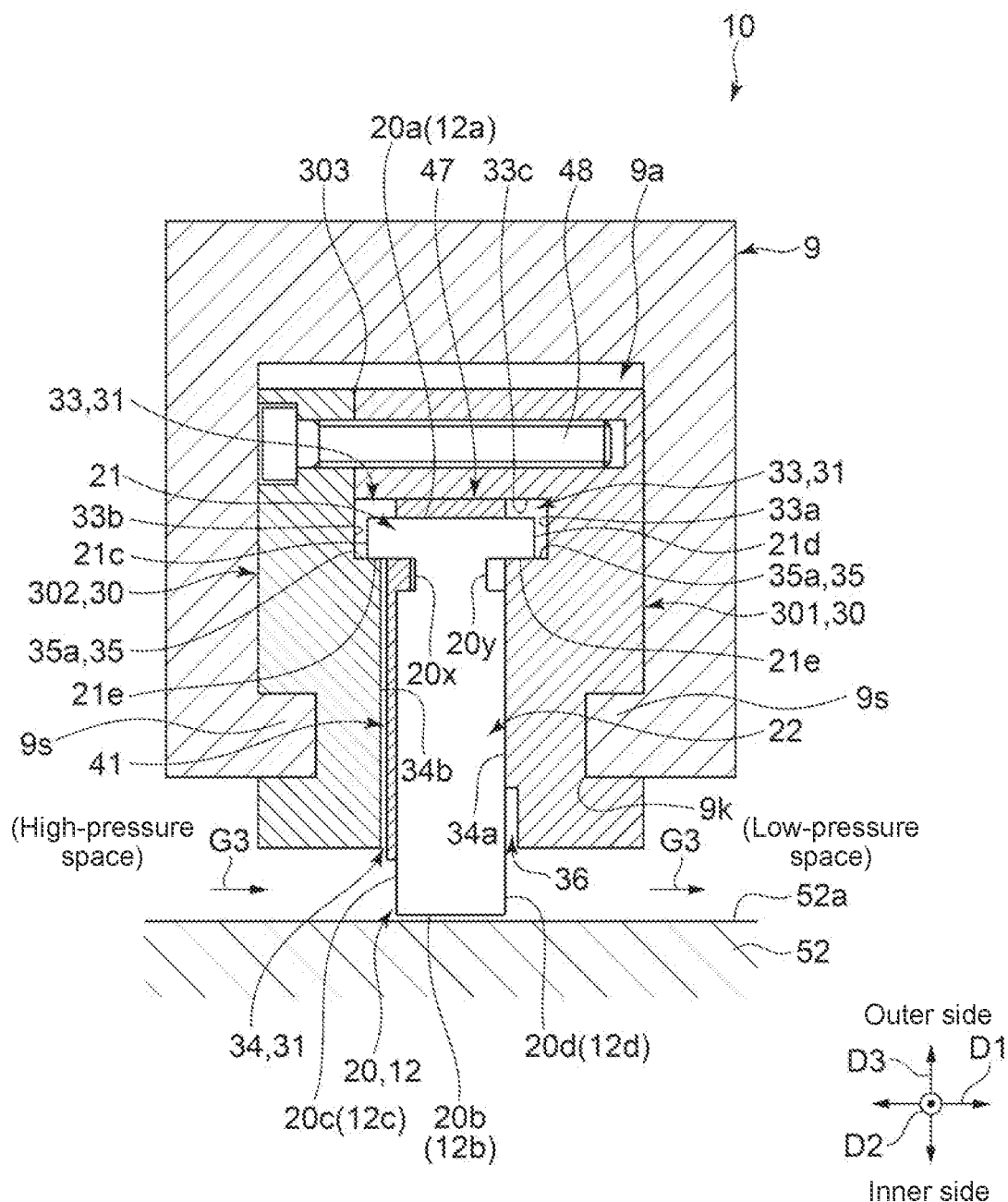
FIG. 4 is a schematic cross-sectional view showing an outline of the shaft seal device according to another embodiment.

FIG. 4 is a schematic cross-sectional view showing an outline of the shaft seal device 10 according to another embodiment and shows a cross section including the axis AX of the rotational shaft 52.

In the following description, among the shaft seal devices 10 respectively provided in the compressor 2 and the turbine 4, the shaft seal devices 10 provided in the turbine 4 will be described. The configuration of the shaft seal devices 10 provided in the compressor 2 is the same as the configuration of the shaft seal devices 10 provided in the turbine 4.

As shown in FIG. 2, the shaft seal device 10 includes the plurality of seal segments 11 arranged on the periphery of the rotational shaft 52, Each seal segment 11 has an arc-like shape in a plane orthogonal to the axis AX. In the present embodiment, for example, eight seal segments 11 are arranged on the periphery of the rotational shaft 50. One of the two seal segments 11 adjacent in the circumferential direction may be referred to as a first segment 11A, and the other may be referred to as a second segment 11B.

Each seal segment 11 includes a plurality of leaves (thin plates) 20 arranged on the periphery of the rotational shaft 52, a side plate 41 on the high pressure side, and a seal ring 30 including seal mounting grooves 31 for mounting the plurality of leaves 20.

As will be described in detail later, in the shaft seal device 10 according to another embodiment shown in FIG. 4, the seal ring 30 is divided into a low-pressure side seal ring (first member) 301 and a high-pressure side seal ring (second member) 302.

In the shaft seal device 10 according to an embodiment shown in FIG. 3, each seal segment 11 includes a coil spring 43 and a tap bolt 45.

In the shaft seal device 10 according to another embodiment shown in FIG. 4, each seal segment 11 includes a shim 47 and a fastening bolt 48. The fastening bolt 48 is a bolt for coupling and integrating the low-pressure side seal ring 301 and the high-pressure side seal ring 302.

As shown in FIGS. 3 and 4, in the present embodiment, the seal segment 11 is inserted into a recess 9a of a housing 9 corresponding to the stator vane 4A, and at least a part of the seal segment 11 is arranged in the recess 9a of the housing 9. The recess 9a has an opening 9k on an inner side in a radial direction D3. The recess 9a extends in a circumferential direction D2 of the rotational shaft 52. A part of the leaf 20 projects to the outside of the recess 9a. The housing 9 is also provided for each of the stator vane 2A, the support part 2S, and the support part 4S.

(Leaf 20)

In the present embodiment, each of the plurality of leaves 20 is a plate-like member having flexibility in the circumferential direction D2 of the rotational shaft 52 and is elastically deformable. In the present embodiment, the leaf 20 is a thin steel plate. The width direction of the leaf 20 substantially coincides with an axial direction D1 of the rotational shaft 52, A normal to a surface of the leaf 20 extends in a direction orthogonal to the axis AX of the rotational shaft 52 and in a direction inclined with respect to the circumferential direction D2 and the radial direction D3 of the rotational shaft 52. That is, a thickness direction of the leaf 20 extends in the direction orthogonal to the axis AX of the rotational shaft 52 and in the direction inclined with respect to the circumferential direction D2 and the radial direction D3 of the rotational shaft 52.

More specifically, the leaf 20 is inclined toward a downstream side in a rotation direction of the rotational shaft 52, as the leaf 20 goes inward in the radial direction D3.

In FIG. 2, a direction of an arrow representing the circumferential direction D2 represents the rotation direction of the rotational shaft 52.

With such configuration, the leaf 20 has relatively high rigidity in the axial direction D1 of the rotational shaft 52.

In the present embodiment, the plurality of leaves 20 are arranged at intervals in the circumferential direction D2 of the rotational shaft 52. A gap S is formed between the leaf 20 and the leaf 20 adjacent to the said leaf 20 (see FIG. 2). The plurality of leaves 20 form a leaf laminate 12 that is an aggregate (laminate) of the plurality of leaves 20.

In the present embodiment, the leaf laminate 12 constituted by the plurality of leaves 20 divides a space on the periphery of the rotational shaft 52 into two spaces in the axial direction D1 of the rotational shaft 52 by sealing the periphery of the rotational shaft 52. In the present embodiment, the Leaf laminate 12 divides the space on the periphery of the rotational shaft 52 into a high-pressure space (high-pressure side region) and a low-pressure space (low-pressure side region) having a relatively lower pressure than the high-pressure space.

In the present embodiment, the plurality of leaves 20 each have an outer proximal end portion (outer end portion) 20a and an inner distal end portion (inner end portion) 20b in the radial direction D3 orthogonal to the axis AX of the rotational shaft 52, and a side end portion 20c which is a side edge close to the high-pressure space among both side edges in the axial direction of the rotational shaft 52 and a side end portion 20d which is a side edge close to a low-pressure space among the both side edges.

In the following description, the proximal end portions 20a of the plurality of leaves 20 may collectively be referred to as a proximal end portion 12a of the leaf laminate 12, the distal end portions 20b of the plurality of leaves 20 may collectively be referred to as a distal end portion 12b of the leaf laminate 12, the side end portions 20c of the plurality of leaves 20 may collectively be referred to as a side end portion 12c of the leaf laminate 12, and the side end portions 20d of the plurality of leaves 20 may collectively be referred to as a side end portion 12d of the leaf laminate 12. The proximal end portion 12a is an aggregate of the plurality of proximal end portions 20a. The distal end portion 12b is an aggregate of the plurality of distal end portions 20b. The side end portion 12c is an aggregate of the plurality of side end portions 20c. The side end portion 12d is an aggregate of the plurality of side end portions 20d.

The proximal end portion 12a is directed outward in the radial direction D3 of the rotational shaft 52. The distal end portion 12b is directed inward in the radial direction D3 of the rotational shaft 52 so as to be opposed to an outer peripheral surface 52a of the rotational shaft 52. Further, the distal end portion 12b (distal end portion 20b) is arranged outside the recess 9a via the opening 9k. The distal end portion 12b (distal end portion 20b) is arranged outside the seal mounting groove 31 which will be described in detail later. The side end portion 12c is directed toward the high-pressure space which is another side in the axial direction D1 of the rotational shaft 52. The side end portion 12d is directed toward the low-pressure space which is one side in the axial direction D1 of the rotational shaft 52.

In the present embodiment, the proximal end portions 20a of the plurality of leaves 20 are fixed to the seal ring 30 and serve as fixed ends, as will be described later. Further, the distal end portions 20b of the plurality of leaves 20 serve as free ends that are not fixed. The plurality of leaves 20 (leaf laminate 12) are held by the seal ring 30 with the proximal end portions 20a fixed.

The leaf 20 includes a head portion 21 provided with the proximal end portion 20a, and an elastically deformable trunk portion 22 provided with the distal end portion 20b, the side end portion 20c, and the side end portion 20d. The dimension of the trunk portion 22 in the width direction of the leaf 20, which is the axial direction D1 of the rotational shaft 52, is smaller than the dimension of the head portion 21. The dimension of the trunk portion 22 in the thickness direction of the leaf 20 is smaller than the dimension of the head portion 21. The trunk portion 22 is provided with a notch 20x and a notch 20y at a boundary between the trunk portion 22 and the head portion 21. The head portion 21 projects in the width direction between the proximal end portion 20a, and the notch 20x and the notch 20y. In the present embodiment, the plurality of leaves 20 are connected to each other by welding in an outer end portion (proximal end portion 20a) of the head portion 21 in the radial direction D3, and in a side end portion 21c and a side end portion 21d of the head portion 21 in the axial direction D1.

(Side Plate 41)

In the present embodiment, the side plate 41 is an arc-like thin plate extending in the circumferential direction D2. A normal to a surface of the side plate 41 extends in the axial direction D1. That is, a thickness direction of the side plate 41 substantially coincides with the axial direction D1 of the rotational shaft 52. In each seal segment 11, the side plate 41 extends in the circumferential direction 172 from an end portion of the seal segment 11 on one side in the circumferential direction D2 to an end portion of the seal segment 11 on another side.

The side plate 41 is arranged adjacent to the side end portion 20c facing the high-pressure side space of the leaf 20 in the seal mounting groove 31. The side plate 41 is opposed to the side end portion 20c whose surface on the one side (low-pressure space side) in the axial direction D1 faces the high-pressure side space of the leaf 20.

(Seal Ring 30)

In the present embodiment, the seal ring 30 is supported by the housing 9 and holds the leaf laminate 12. The housing 9 includes a holding portion 9s for holding the seal ring 30 on the inner side of the recess 9a. The seal ring 30 is held 1w the holding portion 9s.

In the shaft seal device 10 according to an embodiment shown in FIG. 3, the seal ring 30 is one integrally formed member.

In the shaft seal device 10 according to another embodiment shown in FIG. 4, the seal ring 30 includes two members, namely, the low-pressure side seal ring (first member) 301 and the high-pressure side seal ring (second member) 302. In the shaft seal device 10 according to another embodiment shown in FIG. 4, as described above, the low-pressure side seal ring 301 and the high-pressure side seal ring 302 are coupled by the fastening bolt 48 and fixed integrally.

The seal ring 30 shown in FIGS. 3 and 4 is formed with the seal mounting grooves 31 for mounting the plurality of leaves 20. The seal mounting grooves 31 each include a first groove portion 33 in which the head portion 21 of the leaf 20 is arranged, and a second groove portion 34 in which the trunk portion 22 of the leaf 20 is arranged.

The dimension of the first groove portion 33 in the axial direction D1 is larger than the dimension of the second groove portion 34 in the axial direction D1. Consequently, a step portion 35 exists at a boundary between the first groove portion 33 and the second groove portion 34. A surface 35a of the step portion 35 facing outward in the radial direction D3 and an inner end portion 21e of the head portion 21 of the leaf 20 in the radial direction D3 contact each other, restricting the leaf 20 from moving inward in the radial direction D3 with respect to the seal ring 30.

In the embodiment shown in FIG. 3, the tap bolt 45 is mounted in an outer region of the first groove portion 33 in the seal ring 30 in the radial direction D3. The tap bolt 45 is configured to apply a compressive force to the coil spring 43 for biasing the head portion 21 of the leaf 20 inward in the radial direction D3, by pressing the coil spring 43 from the outside in the radial direction D3.

Whereby, in the embodiment shown in FIG. 3, the head portion 21 of the leaf 20 is biased inward in the radial direction D3.

In the embodiment shown in FIG. 4, the seal ring 30 is divided into the low-pressure side seal ring 301 and the high-pressure side seal ring 302 between an inner wall 33a of the first groove portion 33 on the one side (low-pressure space side) in the axial direction D1 and an inner wall 33b of the first groove portion 33 on the another side (high-pressure space side), and at a position on the another side (high-pressure space side) relative to an intermediate position of both the inner walls 33a and 33b in the axial direction D1. In the embodiment shown in FIG. 4, the division position 303 of the low-pressure side seal ring 301 from the high-pressure side seal ring 302 (the contact position of the low-pressure side seal ring 301 with the high-pressure side seal ring 302) is in the vicinity of the inner wall 33a on the one side in the axial direction D1 relative to a center position of the leaf 20 in the axial direction D1.

In the embodiment shown in FIG. 4, the shim 47 is arranged in an outer region of the first groove portion 33 in the seal ring 30 in the radial direction D3, that is, an outer region of the first groove portion 33 in the low-pressure side seal ring 301 in the radial direction D3. The shim 47 is arranged in a gap between the proximal end portion 20a of the leaf 20 and an inner wall 33c of the first groove portion 33 facing inward in the radial direction D3. The shire 47 is a member for fixing the head portion 21 of the leaf 20 so that a surface 35a of the step portion 35 and the end portion 21e of the head portion 21 of the leaf 20 are not separated in the radial direction D3.

Whereby, in the embodiment shown in FIG. 4, the head portion 21 of the leaf 20 is restricted from moving outward in the radial direction D3.

The shaft seal device 10 according to another embodiment shown in FIG. 4 may include the coil spring 43 instead of the shim 47.

In the seal ring 30 shown in FIGS. 3 and 4, an inner wall 34a of the second groove portion 34 in the seal mounting groove 31 on the one side (low-pressure space side) in the axial direction D1 and an inner wall 34b of the second groove portion 34 in the seal mounting groove 31 on the another side (high-pressure space side) are separated from and opposed to each other along the axial direction D1.

In the embodiment shown in FIG. 4, the inner wall 34a on the one side in the axial direction D1 is formed in the low-pressure side seal ring 301, and the inner wall 34b on the another side is formed in the high-pressure side seal ring 302.

In the seal ring 30 shown in FIGS. 3 and 4, during operation of the turbine 4, the leaf 20 and the side plate 41 are biased toward the low-pressure space due to a difference between a pressure of the combustion gas G3 in the high-pressure space and a pressure of the combustion gas G3 in the low-pressure space. Consequently, during operation of the turbine 4, the side end portion 20d of the leaf 20 is pressed against the inner wall 34a.

During operation of the turbine 4, a gap is generated between the inner wall 34b of the seal mounting groove 31 and the surface of the side plate 41 facing the high-pressure side space.

Figure 7:
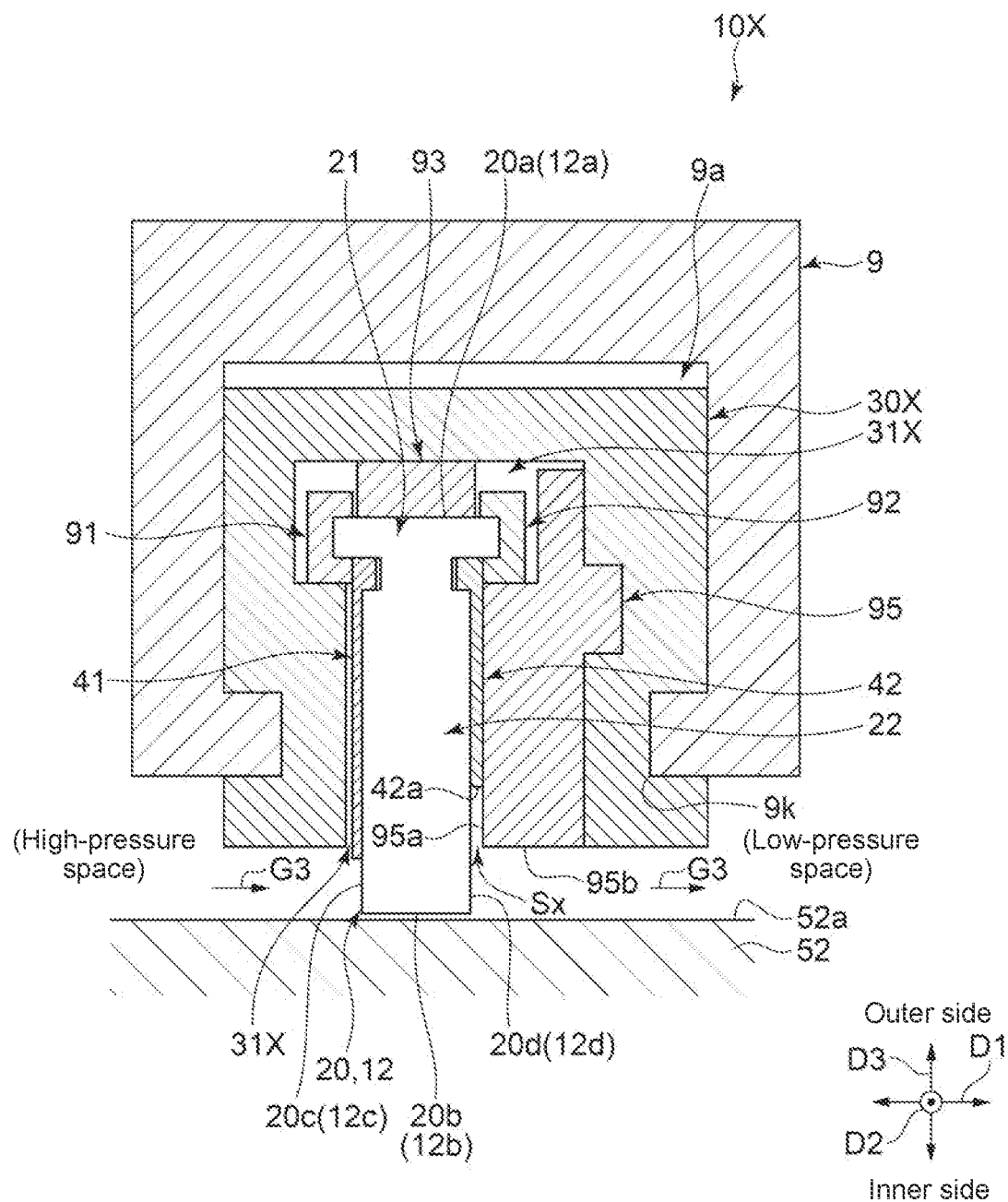
FIG. 7 is a schematic cross-sectional view showing an outline of a conventional shaft seal device including a plurality of leaves.

FIG. 7 is a schematic cross-sectional view showing an outline of a conventional shaft seal device including the plurality of leaves 20 and shows a cross section including the axis AX of the rotational shaft 52.

As with the shaft seal device 10 according to the present embodiment described above, a conventional shaft seal device 10X shown in FIG. 7 includes a plurality of seal segments arranged on the periphery of the rotational shaft 52.

As with the shaft seal device 10 according to the present embodiment described above, the conventional shaft seal device 10X shown in FIG. 7 includes the plurality of leaves (thin plates) 20 arranged on the periphery of the rotational shaft 52, and the side plate 41 on the high-pressure side.

Further, in the conventional shaft seal device 10X shown in FIG. 7, each seal segment includes a seal ring 30X with recessed grooves 31X for mounting the plurality of leaves 20, a pair of leaf seal retainers (retention rings) 91, 92 for holding these leaves 20, a side plate 42 on the low-pressure side, and a plate spring 93. Furthermore, the conventional shaft seal device 10X includes a mounting piece 95 which is arranged in the recessed groove 31X formed in the seal ring 30X, together with these members.

In the conventional shaft seal device 10X shown in FIG. 7, the pair of leaf seal retainers 91, 92 hold the head portion 21 of the leaf 20 from the one side and the another side in the axial direction D1.

In the conventional shaft seal device lox shown in FIG. 7, the side plate 42 is an arc-like thin plate extending in the circumferential direction D2. The thickness direction of the side plate 42 substantially coincides with the axial direction D1 of the rotational shaft 52. In each seal segment, the side plate 42 extends in the circumferential direction D2 from the end portion of the seal segment on the one side in the circumferential direction D2 to the end portion of the seal segment on the another side.

The side plate 42 is arranged adjacent to the side end portion 20d of the leaf 20 facing the low-pressure side space in the recessed groove 31X. The side plate 42 is interposed between the side end portion 20d of the leaf 20 and a side surface 95a of the mounting piece 95 facing the high-pressure side space.

An inner end portion 42a of the side plate 42 in the radial direction D3 is located outward in the radial direction D3 relative to the inner distal end portion (inner end portion) 20b of the leaf 20 in the radial direction D3 and an inner end portion 95b of the mounting piece 95 in the radial direction D3. Consequently, on the inner side in the radial direction D3 relative to the inner end portion 42a of the side plate 42 in the radial direction D3, a gap Sx corresponding to the thickness of the side plate 42 is formed between the side end portion 20d of the leaf 20 and the side surface 95a of the mounting piece 95. The gap Sx plays a role of securing a levitation force of the leaf 20, as with a groove 36 described later.

In the conventional shaft seal device 10X shown in FIG. 7, the plate spring 93 is configured to bias the head portion 21 of the leaf 20 inward in the radial direction D3.

Unlike the conventional shaft seal device 10X shown in FIG. 7, with the shaft seal device 10 according to some embodiments described above, the pair of leaf seal retainers 91, 92, the side plate 42, and the mounting piece 95 described above can be omitted. Thus, it is possible to suppress the cost of the shaft seal device 10.

Further, in the rotary machine including the shaft seal device 10 according to some embodiments described above, it is possible to suppress the cost of the rotary machine while suppressing the leakage of the working fluid in the shaft seal device 10.

In the shaft seal device 10 according to the present embodiment, as in the embodiment shown in FIG. 3, the inner wall 34a of the seal mounting groove 31 on the one side (low-pressure space side) in the axial direction D1 and the inner wall 34b of the seal mounting groove 31 on the another side (high-pressure space side) may be formed of the same member.

Thus, the number of parts can be suppressed and the assembly cost can also be suppressed as compared with the case where the inner wall 34a on the one side and the inner wall 34b on the another side are formed of the different members.

Further, in the shaft seal device 10 according to the present embodiment, as in the embodiment shown in FIG. 4, the inner wall 34a of the seal mounting groove 31 on the one side in the axial direction D1 and the inner wall 341 of the seal mounting groove 31 on the another side may be formed of the different members.

Since the leaf 20 projects inward in the radial direction D3 from the inner end portion of the seal mounting groove 31 in the radial direction D3, the seal ring 30 is open inward in the radial direction D3. Therefore, when the inner wall 34a of the seal mounting groove 31 on the one side and the inner wall 34b of the seal mounting groove 31 on the another side are formed of the same member, upon forming the seal mounting groove 31, the seal mounting groove 31 is formed by cutting from the inside in the radial direction D3. However, since the seal mounting groove 31 has the larger dimension in the radial direction D3 than in the axial direction D1, the outer region (for example, the first groove portion 33) of the seal mounting groove 31 in the radial direction D3 is more difficult to cut than the inner region (for example, the second groove portion 34) of the seal mounting groove 31 in the radial direction D3. As described above, the dimension of the first groove portion 33 in the axial direction D1 is larger than the dimension of the second groove portion 34 in the axial direction D1. Therefore, it is relatively difficult to machine the first groove portion 33 by cutting from the inside in the radial direction D3.

As in the embodiment shown in FIG. 4, since the inner wall 34a of the seal mounting groove 31 on the one side and the inner wall 34b of the seal mounting groove 31 on the another side are formed of the different members, it becomes easier to machine the outer region of the seal mounting groove 31 in the radial direction D3 as well. Consequently, the accuracy of the seal mounting groove 31 can easily be ensured, making it possible to reduce the quantity of fluid leakage in the shaft seal device 10.

As in the embodiment shown in FIG. 4, the shaft seal device 10 according to the present embodiment may be configured such that the low-pressure side seal ring (first member) 301 and the high-pressure side seal ring (second member) 302 are integrally fixed. The contact position (division position 303) of the low-pressure side seal ring 301 with the high-pressure side seal ring 302 is preferably shifted to the above-described one side in the axial direction D1 relative to the center position of the leaf 20 in the axial direction D1. The contact position (division position 303) of the low-pressure side seal ring 301 with the high-pressure side seal ring 302 may be shifted to the another side in the axial direction D1 relative to the center position of the leaf 20 in the axial direction D1.

Consider a case where, in assembling the shaft seal device 10, the leaf 20 is arranged in the member of either the low-pressure side seal ring 301 or the high-pressure side seal ring 302 before the low-pressure side seal ring 301 and the high-pressure side seal ring 302 are coupled together, and then the one member is coupled to the other member.

For example, as shown in FIG. 4, if the division position 303 is shifted to the another side so as to approach the high-pressure space, the portion of the low-pressure side seal ring 301, where the end face corresponding to the division position 303 is formed (the portion where the inner wall 33c is formed), along the axial direction D1 is longer than a similar portion of the high-pressure side seal ring 302. Therefore, when the leaf 20 is attached to the seal ring 30, by placing the leaf 20 from above with the low-pressure side seal ring 301 side down, the portion of the low-pressure side seal ring 301, where the end face corresponding to the division position 303 is formed (the portion where the inner wall 33c is formed), serves as a guide for the leaf 20, facilitating positioning of the leaf 20.

Further, as in the embodiment shown in FIG. 4, the shim 47 is easily arranged in the gap between the proximal end portion 20a of the leaf 20 and the portion where the end face corresponding to the division position 303 is formed (the portion where the inner wall 33c is formed).

Likewise, for example, if the division position 303 is shifted to the one side so as to approach the low-pressure space, the portion of the high-pressure side seal ring 302, where the end face corresponding to the division position 303 is formed, along the axial direction is longer than a similar portion of the low-pressure side seal ring 301. Therefore, when the leaf 20 is attached to the seal ring 30, the leaf 20 and the shim 47 are positioned easily by placing the leaf 20 and the shim 47 from above with the high-pressure side seal ring 302 side down.

In the shaft seal device 10 according to the present embodiment, as in the embodiment shown in FIG. 4, the division position 303 is preferably shifted along the axial direction D1 and in a direction farther from the groove 36 relative to the center position of the leaf 20 along the axial direction D1.

The shaft seal device 10 according to the present embodiment is arranged in the rotary machine such that the groove 36 is positioned in a region (low-pressure side space) on the low-pressure side with the shaft seal device 10 interposed therebetween. Further, in the shaft seal device 10 according to the present embodiment, the side plate 41 extending in the circumferential direction D2 is arranged so as to contact the side end portion 20c which is, of the both side edges of the leaf 20, the side edge opposed to the high-pressure space with the shaft seal device 10 interposed therebetween. Therefore, in assembling the shaft seal device 10, the assembly becomes easier if the assembly is performed such that the side plate 41 is arranged on the leaf 20. In this case, the leaf 20 is arranged from above and then the side plate 41 is arranged from above the leaf 20, with the side of the low-pressure side seal ring 301 having the groove 36 down. Therefore, if the division position 303 is shifted to the another side close to the high-pressure space relative to the above-described center position, the portion of the low-pressure side seal ring 301, where the end face corresponding to the division position 303 is formed, along the axial direction D1 is longer than the similar portion of the high-pressure side seal ring 302.

If the division position 303 is shifted along the axial direction D1 and in the direction farther from the groove 36 relative to the above-described center position, the division position 303 is shifted to the another side relative to the above-described center position, facilitating the assembly of the shaft seal device 10 including the side plate 41.

(As to Groove 36)

In the seal ring 30 shown in FIGS. 3 and 4, the inner wall 34a of the seal mounting groove 31 on the one side in the axial direction D1 has the groove 36 formed along the circumferential direction D2, in the inner region in the radial direction D3.

Figure 5:
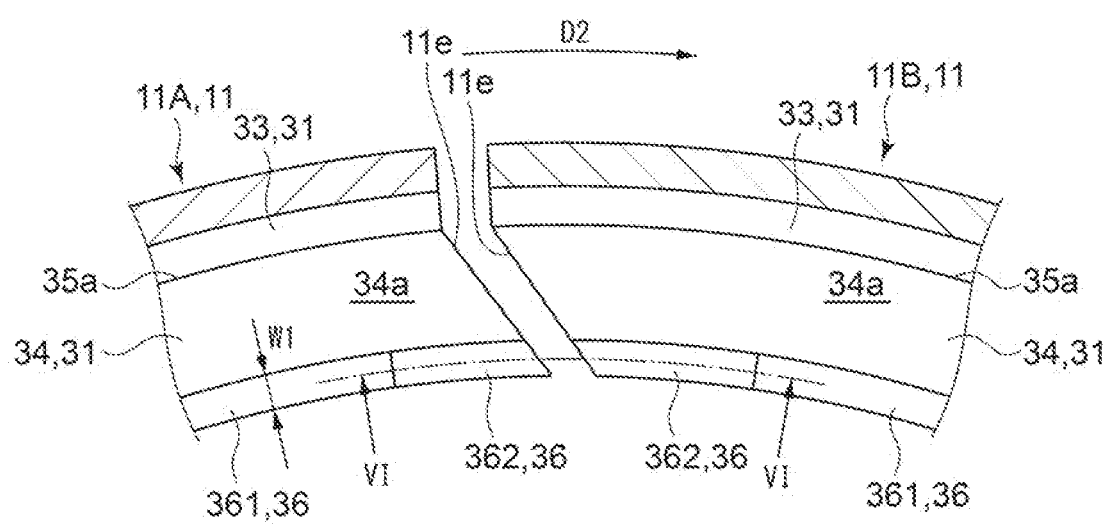
FIG. 5 is a cross-sectional view corresponding to a view V-V in FIG. 3.

FIG. 5 is a cross-sectional view corresponding to a view V-V in FIG. 3, and shows only the seal ring 30.

Figure 6A:
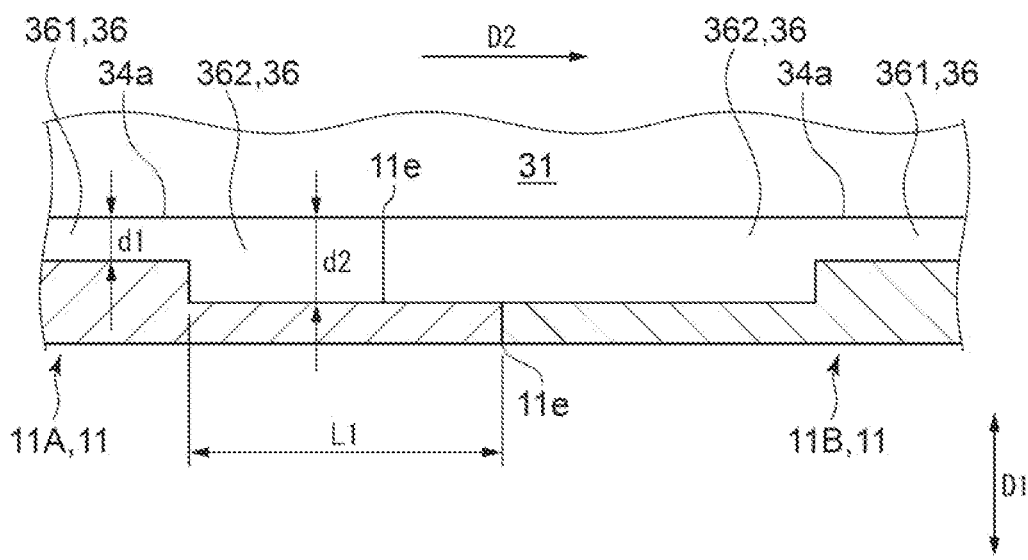
FIG. 6A is a cross-sectional view taken along line VI-VI in FIG. 5 and shows an example of a groove.

FIG. 6A is a cross-sectional view taken along line VI-VI in FIG. 5 and shows an example of the groove 36.

Figure 6B:
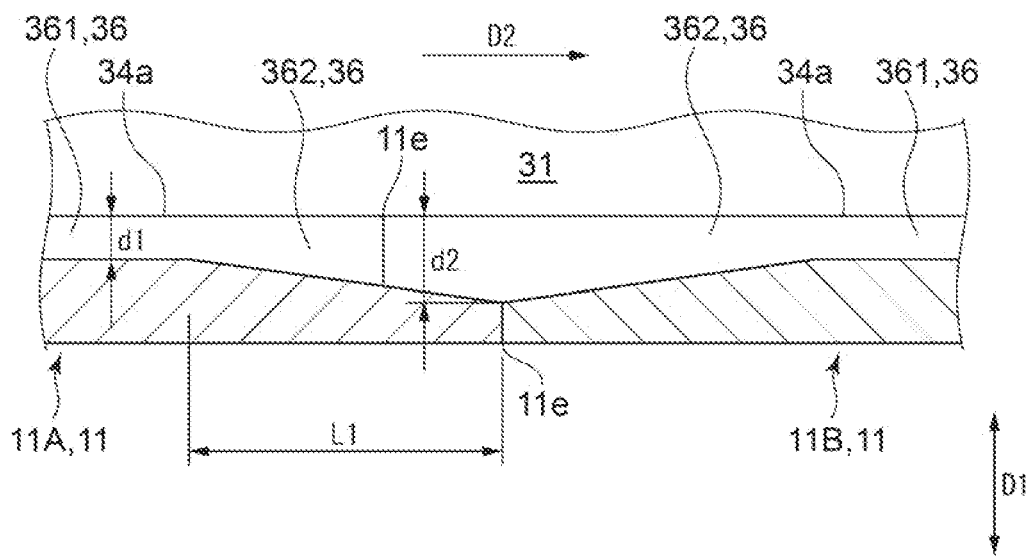
FIG. 6B is a cross-sectional view taken along line VI-VI in FIG. 5 and shows another example of the groove.

FIG. 6B is a cross-sectional view taken along line VI-VI in FIG. 5 and shows another example of the groove 36.

The seal ring 30 shown in FIG. 3 and the seal ring 30 shown in FIG. 4 have the same form of the groove 36, and thus the shape of the groove 36 will be described with reference to FIG. 5 which is the cross-sectional view corresponding to the view V-V in FIG. 3, and FIGS. 6A and 6B.

For the descriptive convenience, although FIG. 5 illustrates the two seal segments 11 adjacent in the circumferential direction D2 to be separated in the circumferential direction D2, there is almost no gap between the two seal segments 11 adjacent in the circumferential direction D2.

FIGS. 6A and 6B illustrate the two seal segments 11 adjacent in the circumferential direction D2 to contact each other in the circumferential direction D2.

FIGS. 5, 6A, and 6B show the first segment 11A which is the one of the two seal segments 11 adjacent in the circumferential direction D2, and the second segment 11B which is the other.

In the seal ring 30 according to the present embodiment shown in FIGS. 3 and 4, as shown in FIGS. 5, 6A, and 6B, the groove 36 in the first segment 11A and the second segment 11B includes a first region 361 in which a depth in the axial direction D1 has a first depth d1, and a second region 362 which is closer to the end face 11e of the first segment 11A and the second segment 11B in the circumferential direction D2 than the first region d1 and has a second depth d2 greater than the first depth d1.

In the vicinity of the end face 11e of the first segment 11A and the second segment 11B adjacent in the circumferential direction, that is, in the vicinity of the division position of the seal ring 30 in the circumferential direction, the levitation force of the leaf 20 decreases and the leaf 20 is easily brought into contact with the rotational shaft 52. Herein, it is known that the levitation force of the leaf 20 increases as a clearance between the side end portion 20d among the both side end portions 20c, 20d of the leaf 20 which is closer to the low-pressure side space and a member (seal ring 30) opposed to the side end portion 20d increases on the distal end side (radially inner side) of the leaf 20.

With the seal ring 30 according to the present embodiment shown in FIGS. 3 and 4, by providing the above-described second region 362, the levitation force of the leaf 20 is secured in the vicinity of the division position of the seal ring 30 in the circumferential direction where the levitation force of the leaf 20 is likely to decrease, making it possible to suppress the contact between the leaf 20 and the rotational shaft 52.

In the seal ring 30 according to the present embodiment shown FIGS. 3 and 4, as shown in FIG. 6A, the second depth d2 of the second region 362 may be constant regardless of the position in the second region 362 in the circumferential direction D2. Consequently, the second region 362 is easily machined as compared with a case where the second depth d2 varies depending on the position in the second region 362 in the circumferential direction D2.

Further, in the seal ring 30 according to the present embodiment shown in FIGS. 3 and 4, as shown in FIG. 6B, the second depth d2 of the second region 362 may increase toward the above-described end face 11e.

The levitation force of the leaf 20 is likely to decrease toward the division position (the above-described end face 11e) of the seal ring 30 in the circumferential direction.

By increasing the second depth d2 as the position in the second region 362 in the circumferential direction D2 approaches the above-described end face 11e as shown in FIG. 6B, it is possible to suppress that the levitation force of the leaf 20 decreases as the position approaches the above-described end face 11e and it is possible to suppress the contact between the leaf 20 and the rotational shaft 52.

In the seal ring 30 according to the present embodiment shown in FIGS. 3 and 4, the first depth d1 is, for example, not less than 0.15 mm and not greater than 0.30 mm, and the second depth d2 is greater than the first depth d1 and is, for example, not less than 0.35 mm and not greater than 0.60 mm. In the first segment 11A and the second segment 11B adjacent in the circumferential direction, the second depth d2 is preferably the same in each of the two second regions 362 adjacent with the end face 11e interposed therebetween.

The second depth d2 is greater than the first depth d1, preferably not more than three times the first depth d1, and more preferably about twice the first depth d1, at least in part of the second region 362.

As shown in FIG. 6B, if the second depth d2 increases toward the end face 11e, the second depth d2 at a position in the circumferential direction D2 that is extremely close to the end face 11e preferably falls within the above-described range.

In order to secure the sufficient levitation force of the leaf 20 in the vicinity of the end face 11e, the second depth is preferably greater than the first depth d1 in at least a pail of the second region 362. Further, the levitation force of the leaf 20 in the vicinity of the end face 11e is almost the same as the case where the second depth d2 is three times the first depth d1, even if the second depth d2 exceeds three times the first depth d1. Therefore, even if the second depth d2 exceeds three times the first depth d1, the result is only an increase in machining amount (cutting amount) for securing the second depth d2.

With the above configuration, it is possible to efficiently secure the levitation force of the leaf 20 in the vicinity of the end face 11e.

In the case of an industrial gas turbine, a width W1 (see FIG. 5) of the groove 36, that is, the dimension of the first region 361 and the second region 362 in the radial direction D3 is approximately 5.5 mm.

Further, in the case of the industrial gas turbine, a length of the second region 362 in the circumferential direction D2 is approximately 50 mm.

The present disclosure is not limited to the above-described embodiments, and also includes an embodiment obtained by modifying the above-described embodiments or an embodiment obtained by combining these embodiments as appropriate.

The contents described in the above embodiments would be understood as follows, for instance.

(1) A shaft seal device 10 according to at least one embodiment of the present disclosure includes: a plurality of thin plates (leaves 20) arranged in a circumferential direction D2 of a rotational shaft 52 (rotational shaft 50) and each having a width in an axial direction D1 of the rotational shaft 52 (rotational shaft 50); and a seal ring 30 including a seal mounting groove 31 for mounting the plurality of thin plates (leaves 20). An inner wall 34a of the seal mounting groove 31 on one side in the axial direction D1 has a groove 36 formed along the circumferential direction D2, in an inner region in a radial direction D3 of the rotational shall 52 (rotational shaft 50).

With the above configuration (I), the pair of leaf seal retainers, the annular plate arranged on the one side (low-pressure space side) in the axial direction D1, and the mounting piece that are provided in the conventional shaft seal device can be omitted. Thus, it is possible to suppress the cost of the shaft seal device 10.

(2) In some embodiments, in the above configuration (1), the seal ring 30 includes at least a first segment 11A and a second segment 11B divided in the circumferential direction D2. The above-described groove 36 in the first segment 11A and the second segment 11B preferably includes a first region 361 in which a depth in the axial direction D1 has a first depth d1, and a second region 362 which is closer to an end face 11e of the first segment 11A and the second segment 11B in the circumferential direction D2 than the first region 361 and has a second depth d2 greater than the first depth d1.

With the above configuration (2), by providing the above-described second region 362, the levitation force of the leaf 20 is secured in the vicinity of the division position of the seal ring 30 in the circumferential direction where the levitation force of the leaf 20 is likely to decrease, making it possible to suppress the contact between the leaf 20 and the rotational shaft 52 (rotational shaft 50).

(3) In some embodiments, in the above configuration (2), the second depth d2 may increase toward the above-described end face 11e.

The levitation force of the leaf 20 is likely to decrease toward the division position (end face 11e) of the seal ring 30 in the circumferential direction.

With the above configuration (3), by increasing the second depth d2 toward the end face 11e, it is possible to suppress that the levitation force of the leaf 20 decreases toward the end face 11e and it is possible to suppress the contact between the leaf 20 and the rotational shaft 52 (rotational shaft 50).

(4) In some embodiments, in the above configuration (2) or (3), the second depth d2 is greater than the first depth d1 and preferably not more than three times the first depth d1, at least in part of the second region 362.

With the above configuration (4), it is possible to efficiently secure the levitation force of the leaf 20 in the vicinity of the division position of the seal ring 30 in the circumferential direction.

(5) In some embodiments, in any one of the above configurations (1) to (4), an inner wall 34a of the seal mounting groove 31 on the above-described one side in the axial direction D1 and an inner wall 34b of the seal mounting groove 31 on another side may be formed of the same member.

With the above configuration (5), the number of parts can be suppressed and the assembly cost can also be suppressed as compared with the case where the inner wall 34a on the one side and the inner wall 34b on the another side are formed of the different members.

(6) In some embodiments, in any one of the above configurations (1) to (4), an inner wall 34a of the seal mounting groove 31 on the one side in the axial direction D1 and an inner wall 34b of the seal mounting groove 31 on another side may be formed of different members.

With the above configuration (6), since the inner wall 34a of the seal mounting groove 31 on the one side and the inner wall 34b of the seal mounting groove 31 on the another side are formed of the different members, the outer region of the seal mounting groove 31 in the radial direction D3 is also machined easily, Consequently, the accuracy of the seal mounting groove 31 can easily be ensured, making it possible to reduce the quantity of fluid leakage in the shaft seal device 10.

(7) In some embodiments, in the above configuration (6), it is preferable to configure such that the seal ring 30 includes a first member (low-pressure side seal ring 301) formed with the inner wall 34a on the one side and a second member (high-pressure side seal ring 302) formed with the inner wall 34b on the another side, and the first member (low-pressure side seal ring 301) and the second member (high-pressure side seal ring 302) are integrally fixed, A contact position (division position 303) of the first member (low-pressure side seal ring 301) with the second member (high-pressure side seal ring 302) is preferably shifted to either the one side or the another side in the axial direction D1 relative to a center position of the thin plates (leaves 20) in the axial direction D1.

With the above configuration (7), the leaf 20 is easily positioned in assembling the shaft seal device 10.

(8) In some embodiments, in the above configuration (7), the above-described contact position (division position 303) may be shifted along the axial direction D1 and in a direction farther from the groove 36 relative to the above-described center position.

With the above configuration (8), since the above-described contact position (division position 303) is shifted to the another side relative to the above-described center position, the shaft seal device 10 including the side plate 41 is assembled easily.

(9) A rotary machine (compressor 2, turbine 4) according to at least one embodiment of the present disclosure, includes: the rotational shaft 50 (rotational shaft 51, rotational shaft 52); and the shaft seal device 10 having any one of the above configurations (1) to (8).

With the above configuration (9), it is possible to suppress the cost of the rotary machine (the compressor 2, the turbine 4) while suppressing the leakage of the working fluid in the shaft seal device 10.

REFERENCE SIGNS LIST

1 Gas turbine system
2 Compressor (rotary machine)
4 Turbine (rotary machine)
10 Shaft seal device
11 Seal segment
11A First seal segment
11B Second seal segment 11e End face
20 Leaf (thin plate)
30 Seal ring
31 Seal mounting groove
34a, 34b Inner wall
41 Side plate (side plate on high-pressure side)
50, 51, 52 Rotational shaft
301 Low-pressure side seal ring (first member)
302 High-pressure side seal ring (second member)
303 Division position

The invention claimed is:

1. A shaft seal device, comprising:
a plurality of thin plates arranged in a circumferential direction of a rotational shaft and each having a width in an axial direction of the rotational shaft; and
a seal ring including a seal mounting groove for mounting the plurality of thin plates,
wherein an inner wall of the seal mounting groove on one side in the axial direction has a groove formed along the circumferential direction, in an inner region in a radial direction of the rotational shaft,
wherein the seal ring includes at least a first segment and a second segment divided in the circumferential direction, and
wherein the groove in the first segment and the second segment includes a first region in which a depth in the axial direction has a first depth, and a second region which is closer to an end face of the first segment and the second segment in the circumferential direction than the first region and has a second depth that is greater than the first depth.

2. The shaft seal device according to claim 1,
wherein the second depth increases toward the end face.

3. The shaft seal device according to claim 1,
wherein the second depth is greater than the first depth and not more than three times the first depth, at least in part of the second region.

4. The shaft seal device according to claim 1,
wherein an inner wall of the seal mounting groove on the one side in the axial direction and an inner wall of the seal mounting groove on another side are formed of the same member.

5. The shaft seal device according to claim 1,
wherein an inner wall of the seal mounting groove on the one side in the axial direction and an inner wall of the seal mounting groove on another side are formed of different members.

6. The shaft seal device according to claim 5,
wherein the seal ring includes a first member formed with the inner wall on the one side and a second member formed with the inner wall on the another side, and the first member and the second member are integrally fixed, and
wherein a contact position of the first member with the second member is located on either the one side or the another side in the axial direction relative to a center position of the thin plates in the axial direction.

7. The shaft seal device according to claim 6,
wherein the contact position is located along the axial direction and in a direction farther from the groove relative to the center position.

8. A rotary machine, comprising:
the rotational shaft; and
the shaft seal device according to claim 1.

* * * * *